UNITED STATES PATENT OFFICE.

EBENEZER KENNARD MITTING, OF CHICAGO, ILLINOIS, ASSIGNOR TO JAMES S. KIRK & CO., OF SAME PLACE, AND ALBERT DOMEIER, OF LONDON, ENGLAND.

TREATMENT OF METALLIC PRECIPITATES.

SPECIFICATION forming part of Letters Patent No. 428,566, dated May 20, 1890.

Application filed December 30, 1889. Serial No. 335,407. (No specimens.)

*To all whom it may concern:*

Be it known that I, EBENEZER KENNARD MITTING, technical chemist, a subject of the Queen of Great Britain and Ireland, residing at Chicago, in the county of Cook and State of Illinois, have invented certain new and useful Improvements in the Treatment of Precipitates Formed in the Recovery of Glycerine from Spent Soap-Lye, of which the following is a specification.

In the recovery of glycerine from soap-lye by processes in which metallic salts are used as purifying and precipitating agents precipitates are met with composed of the metallic radicals in combination with the fatty and other impurities. I may cite as examples of this class of precipitates those occurring from the use of the processes described in United States Patent No. 413,619 to Domeier and Hagemann.

The object of this invention is to recover from the precipitates the fatty matters and metallic salts for use again.

In carrying out my invention I proceed as follows: I take the precipitate, which has been separated from the clear liquor, into a suitable vessel—for instance, a wooden tub—and there add to and mix intimately with it a proportion of a suitable acid, such as hydrochloric acid. The effect of this is to decompose the metallic soaps, which form the larger proportion of the precipitate, and thus set free the fatty and resinous radicals, while at the same time the metallic radicals pass into solution in the acid, (forming, in the case of using hydrochloric acid, chlorides,) together with any excess of the metallic precipitant which may have been used. The reaction is preferably completed at an elevated temperature. The contents of the vessel now separate into two portions or layers, the upper layer consisting of the fatty and resinous acids, together with insoluble organic impurities, and the lower consisting of a solution of the metals. The upper layer, which upon cooling forms a solid or semi-solid mass, I remove and remelt, when the insoluble impurities settle to the bottom, and the clarified fatty and resinous acids I remove therefrom by decantation or filtration, and they may be used again in the manufacture of soap. The insoluble matters, consisting, mainly, of coagulated, albuminous, membraneous, and slurry matters, are available as a nitrogenous fertilizer. The solution of the metals forming the lower layer is directly available for use again as a soluble metallic salt, as described in United States Patent No. 413,619, or it may be converted into a hydrated oxide for use in the process described in said Patent No. 413,619, or into other salts for use in this or other arts.

The conversion into hydrated oxide I effect as follows: To the solution of the metal or metals I add an alkali—such as caustic soda—until no further precipitate is produced. The magma now consists of hydrated oxides of the metals previously used in the finest physical condition for use again in this art, while the salt produced by the union of the acid and alkali employed in the operation finds its way into the spent lye and is recovered (together with that originally present in the lye) in the subsequent evaporation.

It will thus be seen that by the use of acid the metallic salts are dissolved and the fatty matters separated and both rendered fit for use again, while the nitrogenous impurities are separated and made available for fertilizing purposes, and the salts produced by the union of the chemicals employed are also recovered.

I claim—

1. The treatment of precipitates formed in the recovery of glycerine from spent soap-lye and containing metals or metallic salts, which consists in adding thereto acid to dissolve the metallic portion and separate the fatty portion, and then adding to the metallic solution an alkali to precipitate hydrated oxides, as described.

2. The treatment of precipitates formed in the recovery of glycerine from spent soap-lye and containing metals or metallic salts, which consists in adding thereto acid to dissolve the metallic portion and separate the fatty portion, and then adding to the metallic solution an alkali to precipitate hydrated oxides, and introducing the emulsion thus formed into a fresh portion of spent lye to be purified, as described.

EBENEZER KENNARD MITTING.

Witnesses:
FREDERICK C. GOODWIN,
C. C. LINTHICUM.